United States Patent
Wang et al.

(10) Patent No.: US 12,342,324 B2
(45) Date of Patent: *Jun. 24, 2025

(54) METHOD OF SETTING RESERVED SUBFRAMES FOR RESOURCE POOL, USER EQUIPMENT, AND BASE STATION

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,532

(22) Filed: Apr. 25, 2024

(65) Prior Publication Data

US 2024/0276455 A1 Aug. 15, 2024

Related U.S. Application Data

(63) Continuation of application No. 17/698,807, filed on Mar. 18, 2022, now Pat. No. 11,997,650, which is a
(Continued)

(51) Int. Cl.
*H04L 27/26* (2006.01)
*H04L 1/1607* (2023.01)
(Continued)

(52) U.S. Cl.
CPC ............ *H04W 72/02* (2013.01); *H04L 1/1614* (2013.01); *H04L 5/1469* (2013.01);
(Continued)

(58) Field of Classification Search
CPC ... H04W 72/25; H04W 72/40; H04W 56/001; H04L 27/2656
See application file for complete search history.

(56) References Cited

U.S. PATENT DOCUMENTS 11,317,378 B2 * 4/2022 Wang .................... H04L 5/1469
2016/0295624 A1 10/2016 Novlan et al.
(Continued)

FOREIGN PATENT DOCUMENTS

EP 3468272 A1 4/2019
EP 3520523 A2 8/2019
(Continued)

OTHER PUBLICATIONS

R1-1610200, "Considerations on handling wrap-around issue in subframe pool configuration for V2V", Oct. 10-14, 2016, pp. 1-4 (Year: 2016).*
(Continued)

Primary Examiner — Salvador E Rivas
(74) Attorney, Agent, or Firm — Seed IP Law Group LLP (57) ABSTRACT

The present disclosure provides a method of setting reserved subframes for indication of a resource pool by a bitmap, a user equipment, and a base station. In the present disclosure, the resource pool is used for transmitting or receiving sidelink signals within a system frame number cycle that includes predefined subframes and remaining subframes that are subframes after excluding the predefined subframes within the system frame number cycle. In the method, a number of the reserved subframes is determined so that the bitmap is repeated by integer times within the subframes after excluding the reserved subframes and the predefined subframes within the system frame number cycle. In the method, position of each of the reserved subframes is set,
(Continued)

wherein at most two reserved subframes are set per n subframes within the system frame number cycle.

15 Claims, 5 Drawing Sheets

Related U.S. Application Data continuation of application No. 16/326,503, filed as application No. PCT/CN2016/104444 on Nov. 3, 2016, now Pat. No. 11,317,378.

(51) Int. Cl.
| | | |
|---|---|---|
| H04L 5/14 | (2006.01) | |
| H04M 1/72505 | (2021.01) | |
| H04W 28/26 | (2009.01) | |
| H04W 56/00 | (2009.01) | |
| H04W 72/02 | (2009.01) | |
| H04W 72/0446 | (2023.01) | |
| H04W 72/25 | (2023.01) | |
| H04W 72/40 | (2023.01) | |
| H04W 76/15 | (2018.01) | |
| H04W 36/00 | (2009.01) | |
| H04W 80/02 | (2009.01) | |
| H04W 92/18 | (2009.01) | |

(52) U.S. Cl.
CPC .... *H04L 27/2656* (2013.01); *H04M 1/72505* (2013.01); *H04W 28/26* (2013.01); *H04W 56/001* (2013.01); *H04W 72/0446* (2013.01); *H04W 72/25* (2023.01); *H04W 72/40* (2023.01); *H04W 76/15* (2018.02); *H04W 36/0066* (2013.01); *H04W 80/02* (2013.01); *H04W 92/18* (2013.01)

(56) References Cited

U.S. PATENT DOCUMENTS

| | | |
|---|---|---|
| 2016/0302250 A1 | 10/2016 | Sheng |
| 2016/0338055 A1 | 11/2016 | Yang et al. |
| 2017/0048888 A1* | 2/2017 | Belleschi ............... H04W 8/005 |
| 2017/0208616 A1* | 7/2017 | Panteleev ............. H04W 76/14 |
| 2017/0230165 A1 | 8/2017 | Yang et al. |
| 2018/0098322 A1* | 4/2018 | Yoon ..................... H04W 72/23 |
| 2018/0098323 A1* | 4/2018 | Zhang ....................... H04L 5/00 |
| 2019/0029029 A1 | 1/2019 | Ohtsuji et al. |
| 2019/0327732 A1 | 10/2019 | Yoon |

FOREIGN PATENT DOCUMENTS

| | | |
|---|---|---|
| WO | WO 2018030938 A1 | 2/2018 |
| WO | WO 2018062967 A2 | 4/2018 |

OTHER PUBLICATIONS

R1-1609726, "Pool design for V2V", Oct. 10-14, 2016, pp. 1-3 (Year: 2016).*
R1-162640, "SLSS and PSBCH consideration V2V PC5", Apr. 11-15, 2016, pp. 1-8.*
3GPP TS 36.331 V14.0.0, "3rd Generation Partnership Project; Technical Specification Group Radio Access Network; Evolved Universal Terrestrial Radio Access (E-UTRA); Radio Resource Control (RRC); Protocol specification (Release 14)," Sep. 2016, 644 pages.
Ericsson, "Pool design for V2V," R1-1609726, Agenda Item: 7.2.1.5.4, 3GPP TSG RAN WG1 Meeting #86bis, Lisboa, Portugal, Oct. 10-14, 2016, 3 pages.
Extended European Search Report dated Jan. 28, 2020 for related European Patent Application No. 16920786.7, 9 pages.
Extended European Search Report dated Oct. 1, 2019 for related European Patent Application No. 16920786.7, 13 pages.
Indian Examination Report dated Nov. 22, 2021 for related Indian Patent Application No. 201947005965, 6 pages.
International Search Report of PCT application No. PCT/CN2016/104444, dated Jul. 24, 2017, 2 pages.
ITL, "Considerations on handling wrap-around issue in subframe pool configuration for V2V," R1-1610200, Agenda item: 7.2.1.5.4, 3GPP TSG RAN WG1 Meeting #86-bis, Lisbon, Portugal, Oct. 10-14, 2016, 4 pages.
LG Electronics, "Summary of Wednesday V2V offline discussions," R1-168247, Agenda item: 7.2.2, 3GPP TSG RAN WG1 Meeting #86, Gothenburg, Sweden, Aug. 22-26, 2016, 4 pages.

* cited by examiner

METHOD OF SETTING RESERVED SUBFRAMES FOR RESOURCE POOL, USER EQUIPMENT, AND BASE STATION

TECHNICAL FIELD

The present disclosure relates to a method of setting reserved subframes for indication of a resource pool used for transmitting and/or receiving sidelink signals in the V2V/V2X communication system, and user equipment, as well as base station therefor.

BACKGROUND ART

Currently V2V (vehicle to vehicle)/V2X (vehicle to everything) resource pool which is used for transmitting and/or receiving sidelink signals consists of certain resources in time and frequency domains, and the resource positions in the time domain are indicated by a bitmap. If a certain bit of the bitmap indicates "1", it means that it is a V2V/V2X subframe, otherwise if a certain bit of the bitmap indicates "0", it means that it is not a V2V/V2X subframe.

Based on current agreement of 3GPP (the 3rd Generation Partnership Project), the size of the bitmap can be 16, 20 or 100 bits. Which bitmap size is used in the communication could be configured or preconfigured. Based on current agreement of 3GPP, some subframes such as the subframes transmitting sidelink synchronization signal (SLSS) should be excluded for the resource pool, and the bitmap may not be repeated by integer times within the remaining subframes (after excluding SLSS subframes) within the system frame number (SFN/DFN) cycle. For example, it is assumed that there are 10240 subframes within a SFN cycle, and a SLSS subframe is transmitted per 160 ms so there are 64 SLSS subframes within the SFN cycle, the number of the remaining subframes are 10240−64=10176, which cannot be divided by the size of the bitmap such as 20 bits or 100 bits. There would be some resource collision problems in case that the remaining subframes cannot be divided by the size of the bitmap.

Figure 1:
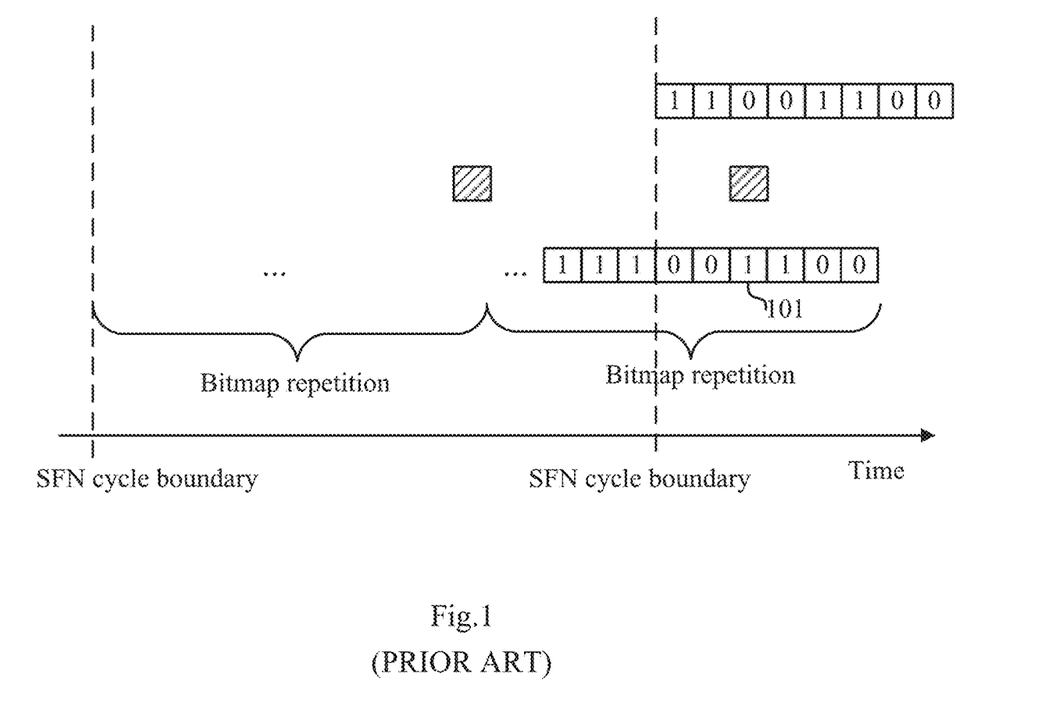
FIG. 1 shows an example of non-integer times of bitmap repetition within the SFN cycle.

FIG. 1 shows an example of non-integer times of bitmap repetition within the SFN cycle.

In FIG. 1, the subframes that are indicated with '1' via a bitmap represent that they are within the resource pool, and the subframes that are indicated with '0' via a bitmap represent that they are not within the resource pool. The indications of the bitmap are repeated within the SFN cycle. In FIG. 1, the subframes indicated by '0' according to the bitmap may be used by other user equipments or other usages like transmitting PUSCH.

As shown in FIG. 1, the last bitmap repetition is crossing the DFN/SFN boundary. If a UE (User Equipment) uses this bitmap and reserves the resource as indicated with a numeral reference '101', the reserved resource may collide with the resources of other UEs in a next DFN/SFN cycle as the bitmap is applied from start or certain offset of SFN/DFN cycle.

Figure 2:
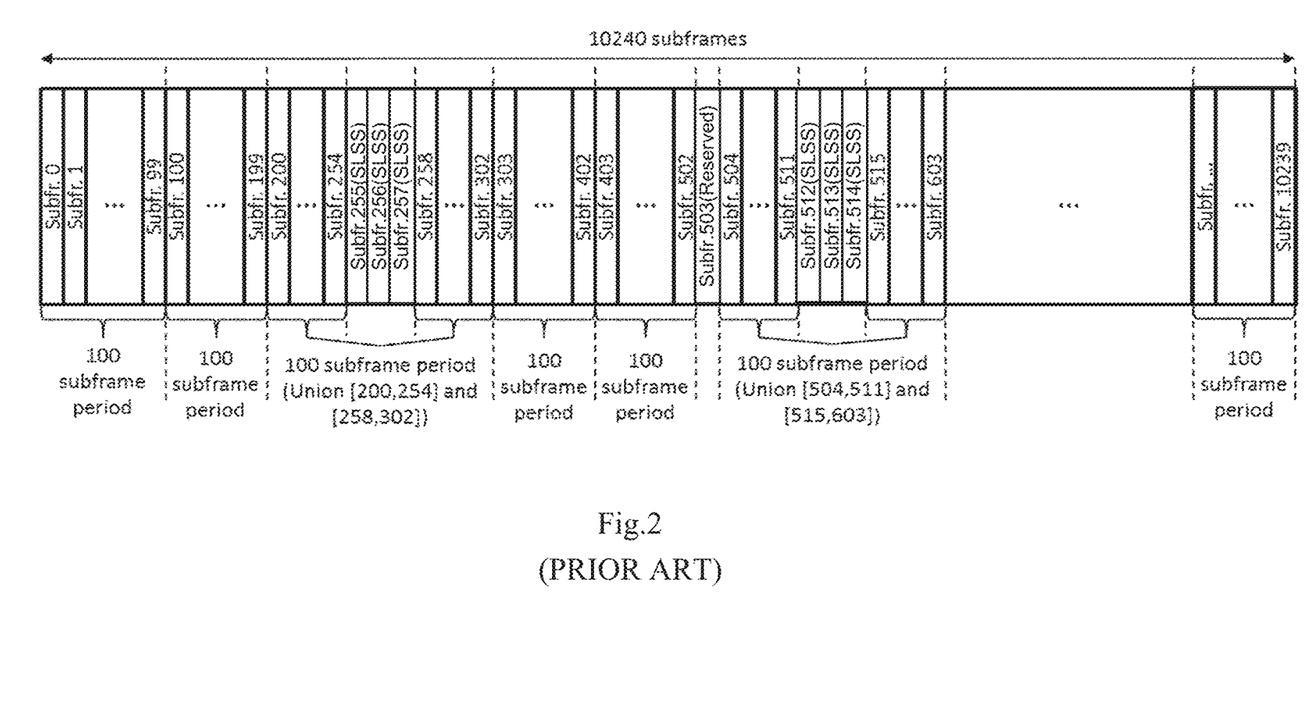
FIG. 2 shows an example that a subframe is reserved within the SFN/DFN cycle presented in the R1-1609726 (a meeting disclosure of RANi)

Based on this consideration, RANi of 3GPP agreed to adopt a concept of "reserved subframe", which should be excluded from the resource pool configuration within the SFN/DFN cycle. In this case, the remaining subframes after excluding the SLSS subframes and the reserved subframes could allow the bitmap repetition with integer times within the SFN/DFN cycle. Still based on the above example that there are 10240 subframes within the SFN cycle, the number of the SLSS subframes is 64, and the number of the reserved subframes is 76, the number of the remaining subframes for the resource pool is 10240−64−76=10100, which could be divided by a 100-bit bitmap. In this case, the collision problem described by FIG. 1 can be solved. FIG. 2 shows an example that a subframe is reserved within the SFN/DFN cycle presented in the R1-1609726 (a meeting disclosure of RANi).

As shown in FIG. 2, a subframe 503 is a reserved subframe and should be excluded for the resource pool. In addition, subframes 255, 256, 257, 512, 513 and 514 are used to transmit the SLSS signals and should be excluded for the resource pool as well.

SUMMARY OF THE DISCLOSURE

Based on the above background art, the problem is how to set or indicate the reserved subframes within the SFN/DFN cycle. Therefore, the present disclosure is made in consideration of the above aspects.

According to one aspect of the present disclosure, there is provided a method of setting reserved subframes for indication of a resource pool by a bitmap. In the present disclosure, the resource pool is used for transmitting or receiving sidelink signals within a system frame number cycle that includes predefined subframes and remaining subframes that are subframes after excluding the predefined subframes within the system frame number cycle. In the method, a number of the reserved subframes is determined so that the bitmap is repeated by integer times within the subframes after excluding the reserved subframes and the predefined subframes within the system frame number cycle. In the method, position of each of the reserved subframes is set, wherein at most two reserved subframes are set per n subframes within the system frame number cycle.

According to another aspect of the present disclosure, there is provided a user equipment for setting reserved subframes for indication of a resource pool by a bitmap. In the present disclosure, the resource pool is used for transmitting or receiving sidelink signals within a system frame number cycle that includes predefined subframes and remaining subframes that are subframes after excluding the predefined subframes within the system frame number cycle. The user equipment comprises a communication unit and a subframe reservation unit. The communication unit is configured to transmit and/or receive sidelink signals. The subframe reservation unit is configured to set the reserved subframes, wherein a number of the reserved subframes is determined so that the bitmap is repeated by integer times within the subframes after excluding the reserved subframes and the predefined subframes within the system frame number cycle, and at most two reserved subframes are set per n subframes within the system frame number cycle.

According to a further aspect of the present disclosure, there is provided a base station for setting reserved subframes for indication of a resource pool by a bitmap. In the present disclosure, the resource pool is used for transmitting or receiving sidelink signals within a system frame number cycle that includes predefined subframes and remaining subframes that are subframes after excluding the predefined subframes within the system frame number cycle. The base station comprises a communication unit and a subframe reservation unit. The communication unit is configured to transmit and/or receive sidelink signals. The subframe reservation unit is configured to set the reserved subframes, wherein a number of the reserved subframes is determined so that the bitmap is repeated by integer times within the subframes after excluding the reserved subframes and the predefined subframes within the system frame number cycle, and at most two reserved subframes are set per n subframes within the system frame number cycle.

The method, user equipment, and base station of the present disclosure could realize the advantages that the resource waste and sidelink transmission latency in the communication system are minimized.

BRIEF DESCRIPTION OF THE DRAWINGS

These and/or other aspects and advantages of the present disclosure will become more clear and easier to be understood in detailed description of embodiments of the present disclosure below in conjunction with attached drawings, in which.

DESCRIPTION OF THE EMBODIMENTS

In the following detailed description, reference is made to the accompanying drawings, which form a part of the present disclosure. In the drawings, similar symbols typically indicate similar components, unless the context dictates otherwise. It will be readily understood that aspects of the present disclosure can be arranged, substituted, combined, and designed in a wide variety of different configurations, all of which are explicitly contemplated and make a part of the present disclosure.

Figure 3:
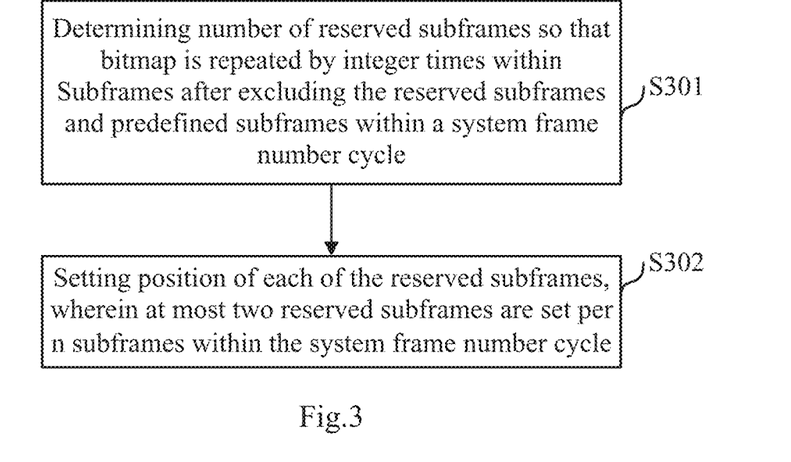
FIG. 3 shows a flowchart of the method of setting the reserved subframes for the resource pool according to one embodiment of the present disclosure.

FIG. 3 shows a method of setting the reserved subframes according to one embodiment of the present disclosure.

The method as shown in FIG. 3 is performed in a V2V (Vehicle to vehicle)/V2X (vehicle to everything) communication system. In the V2V/V2X communication system, the resource pool is used for transmitting and/or receiving sidelink signals within a system frame number (SFN/DFN) cycle. DFN is Direct Frame Number which could refer to 3GPP TS 36.331. It is a cycle which consists of uplink subframes. In FDD, SFN cycle is basically the same as DFN cycle, but in TDD, SFN cycle will include all of downlink subframe, special subframe and uplink subframes. The proposed methods could be used for both SFN cycle and DFN cycle, but for description simplicity, SFN is mainly assumed in the following examples.

The system frame number (SFN) cycle includes predefined subframes and remaining subframes. The remaining subframes are subframes after excluding the predefined subframes within the system frame number cycle. In the present disclosure, a bitmap indicates whether or not a subframe is a V2V/V2X resource. In the present disclosure, the terms "predefined subframe" and "excluded subframe" have the same meaning in the context. The method as shown in FIG. 3 can be executed in either a user equipment side or a base station side.

As shown in FIG. 3, the method of setting the reserved subframes for indication of a resource pool according to one embodiment of the present disclosure comprises of a step S301 and a step S302. In the step S301, a number of the reserved subframes is determined so that the bitmap is repeated by integer times within the subframes after excluding the reserved subframes and the predefined subframes within the system frame number cycle. In the step S302, a position of each of the reserved subframes is set, wherein at most two reserved subframes are set per n subframes within the system frame number cycle.

According to an embodiment of the present disclosure, the number of the reserved subframes can be determined based on the size of the bitmap and the number of the remaining subframes within the system frame number cycle. For example, the number of the reserved subframes equals to the operation of (the number of the remaining subframes) mod (the bitmap size). Specifically, the number 'Y' of the reserved subframes can be determined based on the following formula: X=(a number of the total subframes within a system frame number cycle–a number of the predefined subframes within a system frame number cycle), and Y=X mod (the bitmap size).

Figure 4:
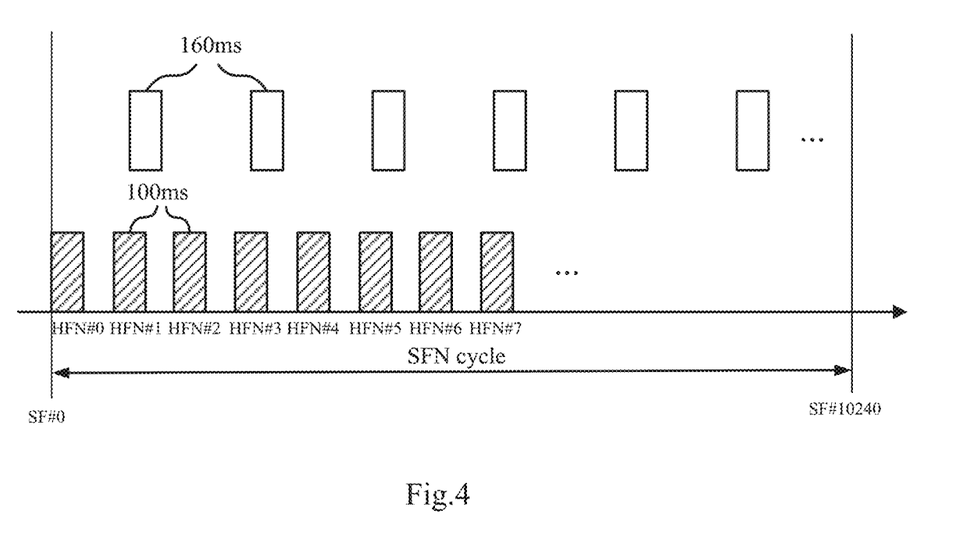
FIG. 4 shows an example of the method of setting the reserved subframes for the resource pool according to one embodiment of the present disclosure.

FIG. 4 shows an example of the method of setting the reserved subframes according to one embodiment of the present disclosure.

In the FIG. 4, each subframe is transmitted in a time of 1 ms. In FIG. 4, the blank blocks represent the excluded subframes such as SLSS subframes, and the blocks with oblique lines represent the reserved subframes.

As stated above, based on the agreement, the subframes transmitting sidelink synchronization signal (SLSS) should be excluded for the resource pool. In the following context, the subframes that should be excluded is referred to as "excluded subframes" or "predefined subframes". In the example as shown in FIG. 4, it is assumed that there are 10240 subframes within a system frame number (SFN) cycle, and each SLSS subframe is transmitted per 160 ms so there are 64 SLSS subframes within the SFN cycle. The number of the remaining subframes after the excluded subframes are excluded are 10240−64=10176.

For a bitmap with a size of 16 bits, the number of the reserved subframe is 0 as the calculation (10176 mod 16) equals to 0. For a bitmap with a size of 20 bits, the number of the reserved subframe is 16 as the calculation (10176 mod 20) equals to 16. For a bitmap with a size of 100 bits, the number of the reserved subframe is 76 as the calculation (10176 mod 100) equals to 76.

According to an embodiment of the present disclosure, the 'n' subframes are determined based on subframe index that is continuous within the system frame number cycle. For example, the subframe index can be the subframe order number such as SF #0, SF #1, SF #2, SF #3, . . . , SF #10240 as shown in FIG. 4, which are continuous within the system frame number cycle. In this case, the above 'n subframes' include both of the remaining subframes and the predefined subframes such as SLSS subframes. That is, the reserved subframes are set per 'n subframes' no matter whether or not the predefined subframes are contained in the 'n subframes'.

In this situation, the position of a reserved subframe may overlap with any of the predefined subframes which should be excluded for indication of the resource pool within the system frame number cycle. In this case, the reserved subframe should be set in a subframe closest to and before or after the predefined subframe within the remaining subframes.

According to an embodiment of the present disclosure, as shown in FIG. 4, it can be assumed that n=100, i.e., one subframe can be reserved per 100 subframes (as indicated as HFN). According to another embodiment, the "100 subframes" can be counted from the start of system frame number cycle (in this example, the number of subframe offset is assumed as zero). In an example that there is a subframe offset within the SFN cycle, the "100 subframes" can be counted from the end of the subframe offset within system frame number cycle.

In this case, for a bitmap with a size of 20 bits, the number of the reserved subframe is 16, so the reserved subframes can be from HFN #0 to HFN #15. For a bitmap with a size of 100 bits, the number of the reserved subframe is 76, so the reserved subframes can be from HFN #0 to HFN #75.

According to another example, the "100 subframes" are not necessary to be counted from the start of the system frame number cycle, the "100 subframes" can be counted from any position of the system frame number cycle. For example, In the case of a bitmap with a size of 20 bits, the number of the reserved subframe is 16, the "100 subframes" can be from HFN #10 to HFN #25, or from HFN #84 to HFN #99, etc. In the case of a bitmap with a size of 100 bits, the number of the reserved subframe is 76, the "100 subframes" can be from HFN #0 to HFN #75, or from HFN #10 to HFN #85, or from HFN #24 to HFN #99, etc.

For the embodiment that n=100, the benefit is that it is a simple solution from standardization point of view, and it can be used for any case considering that a maximum number of subframes after mod operation is 99. Also as the position of the reserved subframe is somehow common, different resource pool configurations may be related with the same reserved subframes so that resource utilization is improved.

According to another example of the present embodiment, the n subframes can be determined based on the remaining subframes within the system frame number cycle. That means that the above 'n subframes' do not include the predefined subframes. That is, the reserved subframes are set per 'n subframes' in which the 'n subframes' are n remaining subframes available for the resource pool that do not contain the predefined subframes.

According to an example of the present embodiment, the number 'n' equals to the operation of FLOOR (the number of the remaining subframes/the number of the reserved subframes)", where FLOOR is the operation of round down to the nearest integer. Specifically, the number 'n' can be determined based on the following formula:

$X$ = (a number of the total subframes within a system frame number cycle − a number of the predefined subframes within a system frame number cycle)

$Y = X$ mod (bitmap size)

$n = FLOOR(X/Y)$ where $FLOOR$ is the operation of round down to the nearest integer.

According to another embodiment of the present disclosure, the number 'n' could be configured or preconfigured.

According to another example of the embodiment, a reserved subframe and an excluded subframe such as the SLSS subframe can not overlap. If their positions overlap, the reserved subframe should be placed in a subframe before or after the excluded subframe that is overlapped.

Figure 5:
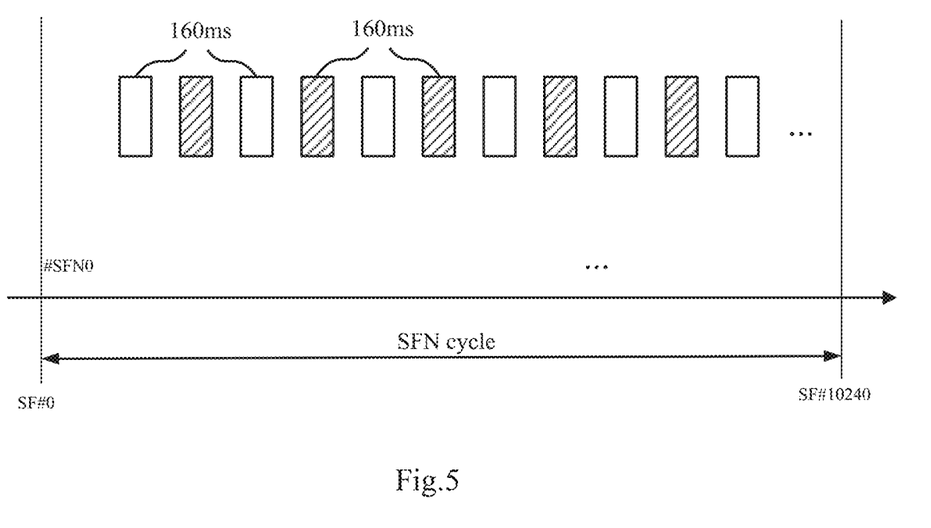
FIG. 5 shows another example of the method of setting the reserved subframes for the resource pool according to one embodiment of the present disclosure.

FIG. 5 shows another example of the method of setting the reserved subframes according to one embodiment of the present disclosure.

In FIG. 5, the blank blocks represent the predefined subframes such as the SLSS subframes, and the blocks with oblique lines represent the reserved subframes.

In this example, it is also assumed that there are 10240 subframes within a SFN cycle, and 64 SLSS subframes are excluded for V2X resource pool in which 160 ms periodicity of a SLSS subframe is assumed so that the remaining subframes are 10240−64=10176 subframes.

In the example as shown in FIG. 5, each of the reserved subframes is set at middle of two predefined subframes such as the SLSS subframes that are adjacent to each other. In this case, since each SLSS subframe is transmitted in a period of 160 ms periodicity, one or two reserved subframes are set per 160 subframes within the system frame number cycle.

Specifically, for a bitmap with a size of 16 bits, the number of the reserved subframe is 0. For a bitmap with a size of 20, the number of the reserved subframe is 16, and one reserved subframe can be set at middle of two SLSS subframes from start or other positions of the SFN cycle.

However, for a bitmap with a size of 100 bits, the number of the reserved subframe is 76. In this case, if only one reserved subframe is set at middle of two adjacent predefined subframes such as the SLSS subframes, there are 13 reserved subframes left nowhere to be set. According to another example of the present disclosure, a pair of two reserved subframes will be set at middle of two predefined subframes such as the SLSS subframes. The number of "2" reserved subframes between the same two predefined subframes such as the SLSS subframes is 76−63=13, and the number of '1' reserved subframes is 63. The pattern setting the reserved subframes may be like {222 . . . 111 . . . 111}, or {111 . . . 222 . . . 111}, or {111 . . . 111 . . . 222}, {222 . . . 222 . . . 111}, or {111 . . . 222 . . . 222}, or {222 . . . 111 . . . 222}, or {222 . . . 222 . . . 222}, or others. The above pattern means that the "2" reserved subframes between the same two predefined subframes such as the SLSS subframes can be placed at any position within the SFN cycle.

The benefit of such an embodiment is that all the predefined subframes and the reserved subframes for the resource pool are distributed as much as possible and it minimizes the latency of the sidelink signal transmission.

Figure 6:
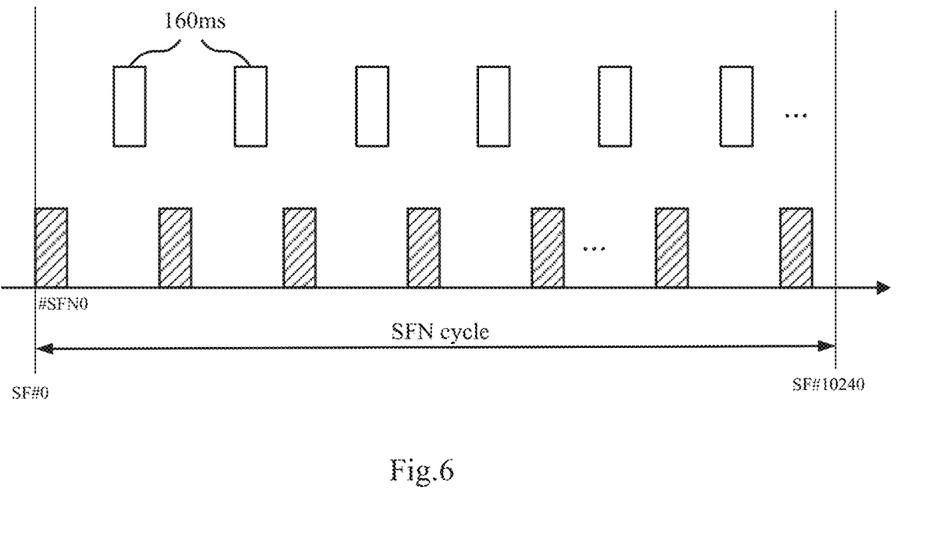
FIG. 6 shows a further example of the method of setting the reserved subframes for the resource pool according to one embodiment of the present disclosure.

FIG. 6 shows a further example of the method of setting the reserved subframes according to one embodiment of the present disclosure.

In this example, it is also assumed that there are 10240 subframes within a SFN cycle, 64 SLSS subframes are excluded for V2X resource pool, and the periodicity of a SLSS subframe is assumed as 160 ms, so V2X resource pool has 10240−64=10176 subframes.

As stated above, the number 'n' can be determined based on the following formula:

$$X = \text{(a number of the total subframes within a system frame number cycle} - \text{a number of the predefined subframes within a system frame number cycle)}$$

$$Y = X \bmod \text{(bitmap size)}$$

$$n = FLOOR(X/Y)$$

where FLOOR is the operation of round down to the nearest integer.

Based on the above formula, for a bitmap with a size of 100 bits, X=10176, Y=10176 mod 100=76, n=floor (10176/76)=133. Therefore, one reserved subframe can be set per 133 subframes within the SFN cycle, and totally there are 76 reserved subframes. In this case, the bitmap with 100 bits could be repeated by integer times within the SFN cycle. For a bitmap with a size of 16 bits and a bitmap with a size of 20 bits, the same procedure could be carried out.

According to another example of the present embodiment, in addition to the sidelink synchronization subframes (SLSS), the predefined subframes can further include downlink subframes and special subframes in TDD, and subframes indicated by a subframe offset with the first system frame number (SFN #0) within the system frame number cycle. That is, the predefined subframes include at least one of the downlink subframes and the special subframes in TDD, the sidelink synchronization subframes, and the subframes indicated by a subframe offset with the start of the system frame number cycle. In a special case for example for FDD, the subframe offset could be set to zero.

Specifically, in case of TDD where there are downlink (DL) subframes, special subframes and uplink (UL) subframes, the DL subframes and the special subframes as well as the SLSS subframes should be excluded for the resource pool. For example, for TDD configuration 0, there are only 1024 uplink subframes within a SFN cycle, and these 1024 uplink subframes are potential subframes for V2X resource pool. Assuming the number of the SLSS subframes is 64, the remaining subframes are 1024−64=960 subframes for V2X resource pool. Based on the above formula, X=960, Y=(960 mod 100)=60, n=FLOOR (960/60)=16. It means that one reserved subframe is set per 16 uplink subframes.

Figure 7:
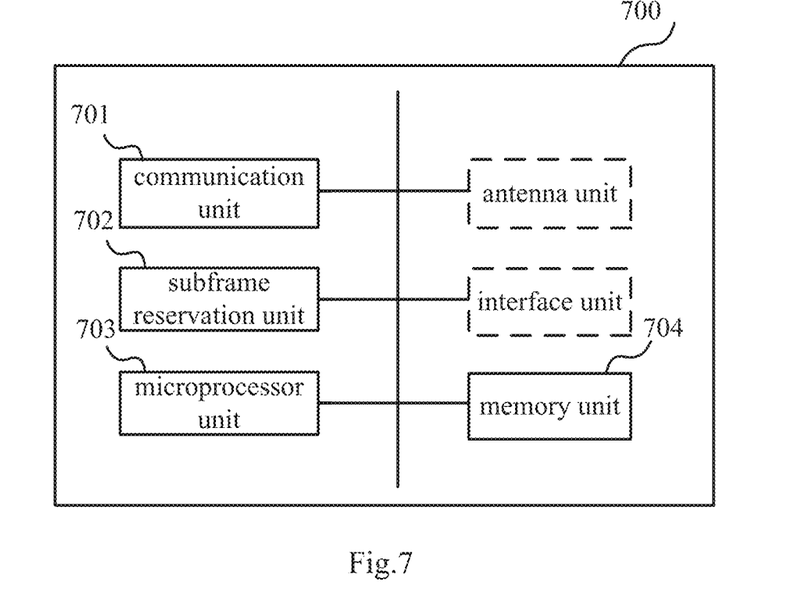
FIG. 7 shows an example of a user equipment for communication by use of the resource pool according to one embodiment of the present disclosure.

FIG. 7 shows an example of the user equipment for setting reserved subframes according to one embodiment of the present disclosure.

In the user equipment as shown in FIG. 7, the resource pool is used for transmitting and/or receiving sidelink signals within a system frame number cycle. The system frame number cycle includes predefined subframes and remaining subframes. The remaining subframes are subframes after excluding the predefined subframes within the system frame number cycle. A bitmap indicates whether or not a subframe is a V2V/V2X resource.

As shown in FIG. 7, the user equipment 700 according to the embodiment of the present disclosure includes a communication unit 701, a subframe reservation unit 702, a microprocessor unit 703, and a memory unit 704. The above respective units are interconnected by use of data and/or control bus within the user equipment 700.

According to an embodiment of the present disclosure, the user equipment 700 is configured to communicate with other user equipments or base stations by use of a resource pool.

The communication unit 701 is configured to transmit sidelink signals to other user equipments or base stations and/or receive sidelink signals from the other user equipments or base stations by use of V2V (vehicle to vehicle)/V2X (vehicle to everything) resource pool in the communication system. The communication unit 701 may further comprise other hardware such as a baseband processor and a radio frequency modulation unit for processing and/or modulating the signals to be transmitted in the communication system.

The subframe reservation unit 702 is configured to set reserved subframes, wherein a number of the reserved subframes is determined so that the bitmap is repeated by integer times within the subframes after excluding the reserved subframes and the predefined subframes within the system frame number cycle, and at most two reserved subframes are set per n subframes within the system frame number cycle.

The microprocessor unit 703 is configured to execute related programs to process various data stored in the memory unit 704, and control operations of respective units in the user equipment 700.

The memory unit 704 may further include a ROM (Read Only Memory) and a RAM (Random Access Memory) which are not shown in the Figure. The ROM is configured to store various programs required for performing various processes and controls by the microprocessor 703, and the RAM is configured to store intermediate data temporarily produced in the procedure of the processes and controls by the microprocessor unit 703.

According to one embodiment of the present disclosure, the user equipment 700 may further comprise an antenna unit. The antenna unit is configured to transmit and/or receive signals to and/or from other user equipments or base stations.

According to one embodiment of the present disclosure, the user equipment 700 may further comprise an interface unit. The interface unit may be but not limited to one type of USB, IEEE13954, RJ11, RJ45, etc. The interface unit is configured to connect with user's external devices, such as but not limited to a computer device, a keyboard, or a mouse, and receive control information and/or program command from the user and/or output data to the user's external devices.

Respective devices and/or units as described above do not limit the scope of the present disclosure, and the user equipment 700 of the present disclosure may include more or less devices and/or units.

According to another embodiment of the present disclosure, the number of the reserved subframes is determined based on the size of the bitmap and the number of the remaining subframes within the system frame number cycle.

According to another embodiment of the present disclosure, the number of the reserved subframes equals to the operation of (the number of the remaining subframes) mod (the bitmap size).

According to another embodiment of the present disclosure, each of the reserved subframes is set at middle of the adjacent predefined subframes.

According to another embodiment of the present disclosure, the n subframes are based on subframe index that is continuous within the system frame number cycle.

According to another embodiment of the present disclosure, if the position of the reserved subframe overlaps with any of the predefined subframe that should be excluded for indication of the resource pool within the system frame number cycle, the reserved subframe is set in a closest subframe before or after the predefined subframe within remaining subframes.

According to another embodiment of the present disclosure, the number 'n' is at least 100.

According to another embodiment of the present disclosure, the n subframes are based on the remaining subframes within the system frame number cycle.

According to another embodiment of the present disclosure, the number n equals to the operation of FLOOR (the number of the remaining subframes/the number of the reserved subframes)", where FLOOR is the operation of round down to the nearest integer.

According to another embodiment of the present disclosure, the predefined subframes include at least one of downlink subframes and special subframes in TDD, sidelink synchronization subframes, and subframes indicated by a subframe offset with the start of system frame number within the system frame number cycle.

Figure 8:
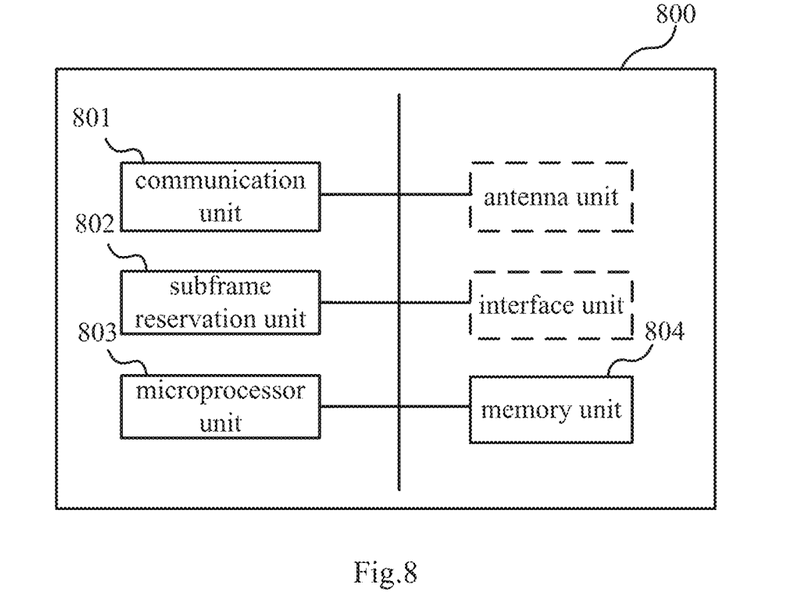
FIG. 8 shows an example of a base station for communication by use of the resource pool according to one embodiment of the present disclosure.

FIG. 8 shows an example of the base station for setting reserved subframes according to one embodiment of the present disclosure.

In the base station as shown in FIG. 8, the resource pool is used for transmitting and/or receiving sidelink signals within a system frame number cycle. The system frame number cycle includes predefined subframes and remaining subframes. The remaining subframes are subframes after excluding the predefined subframes within the system frame number cycle. A bitmap indicates whether or not a subframe is a V2V/V2X resource.

As shown in FIG. 8, the base station 800 according to the embodiment of the present disclosure includes a communication unit 801, a subframe reservation unit 802, a microprocessor unit 803, and a memory unit 804. The above respective units are interconnected by use of data and/or control bus within the base station 800.

According to an embodiment of the present disclosure, the base station 800 is configured to communicate with other base stations or user equipments by use of the resource pool.

The communication unit 801 is configured to transmit sidelink signals to other base stations or user equipments and/or receive sidelink signals from the other base stations or user equipments by use of V2V (vehicle to vehicle)/V2X (vehicle to everything) resource pool in the communication system. The communication unit 801 may further comprise other hardware such as a baseband processor and a radio frequency modulation unit for processing and/or modulating the signals to be transmitted in the communication system.

The subframe reservation unit 802 is configured to set reserved subframes, wherein the number of the reserved subframes is determined so that the bitmap is repeated by integer times within the subframes after excluding the reserved subframes and the predefined subframes within the system frame number cycle, and at most two reserved subframes are set per n subframes within the system frame number cycle.

The microprocessor unit 803 is configured to execute related programs to process various data stored in the memory unit 804, and control operations of respective units in the base station 800.

The memory unit 804 may further include a ROM (Read Only Memory) and a RAM (Random Access Memory) which are not shown in the Figure. The ROM is configured to store various programs required for performing various processes and controls by the microprocessor 803, and the RAM is configured to store intermediate data temporarily produced in the procedure of the processes and controls by the microprocessor unit 803.

According to one embodiment of the present disclosure, the base station 800 may further comprise an antenna unit. The antenna unit is configured to transmit and/or receive sidelink signals to and/or from other base stations or user equipments.

According to one embodiment of the present disclosure, the base station 800 may further comprise an interface unit. The interface unit may be but not limited to one type of USB, IEEE13954, RJ11, RJ45, etc. The interface unit is configured to connect with user's external devices, such as but not limited to a computer device, a keyboard, or a mouse, and receive control information and/or program command from the user and/or output data to the user's external devices.

Respective devices and/or units as described above do not limit the scope of the present disclosure, and the base station 800 of the present disclosure may include more or less devices and/or units.

According to another embodiment of the present disclosure, the number of the reserved subframes is determined based on the size of the bitmap and the number of the remaining subframes within the system frame number cycle.

According to another embodiment of the present disclosure, the number of the reserved subframes equals to the operation of (the number of the remaining subframes) mod (the bitmap size).

According to another embodiment of the present disclosure, each of the reserved subframes is set at middle of the adjacent predefined subframes.

According to another embodiment of the present disclosure, the n subframes are based on subframe index that is continuous within the system frame number cycle.

According to another embodiment of the present disclosure, if the position of the reserved subframe overlaps with any of the predefined subframe that should be excluded for indication of the resource pool within the system frame number cycle, the reserved subframe is set in a closest subframe before or after the predefined subframe within remaining subframes.

According to another embodiment of the present disclosure, the number 'n' is at least 100.

According to another embodiment of the present disclosure, the n subframes are based on the remaining subframes within the system frame number cycle.

According to another embodiment of the present disclosure, the number 'n' equals to the operation of FLOOR (the number of the remaining subframes/the number of the reserved subframes)", where FLOOR is the operation of round down to the nearest integer.

According to another embodiment of the present disclosure, the predefined subframes include at least one of downlink subframes and special subframes in TDD, sidelink synchronization subframes, and subframes indicated by a subframe offset with the start of system frame number within the system frame number cycle.

The above embodiments of the present disclosure are only exemplary description, and their specific structures and operations do not limit the scope of the present disclosure. Those skilled in the art can recombine different parts and operations of the above respective embodiments to produce new implementations which equally accord with the concept of the present disclosure.

The embodiments of the present disclosure may be implemented by hardware, software and firmware or in a combination thereof, and the way of implementation does not limit the scope of the present disclosure.

The connection relationships between the respective functional elements (units) in the embodiments of the present disclosure do not limit the scope of the present disclosure, in which one or multiple functional element(s) or unit(s) may contain in or be connected to any other functional elements.

Although several embodiments of the present disclosure has been shown and described in combination with attached drawings above, those skilled in the art would understand that variations and modifications which still fall into the scope of claims and their equivalents of the present disclosure can be made to these embodiments without departing from the principle and spirit of the present disclosure.

The invention claimed is:

1. A communication apparatus comprising:
  circuitry, which, in operation, determines a first set of subframes available for a sidelink operation; and
  a receiver, which, in operation, receives a sidelink signal in a subframe among the first set of subframes,
  wherein the first set of subframes is formed of 10240 subframes minus a second set of subframes and minus reserved subframes, the second set of subframes including subframes for transmitting a sidelink synchronization signal (SLSS), and the reserved subframes being determined based on a length of a bitmap configured for the first set of subframes, and
  wherein a number of the reserved subframes (Y) within the 10240 subframes is determined by:

$$Y = X \bmod (\text{the length of the bitmap}),$$
where $X = 10240 - (\text{a number of subframes in the second set of subframes})$.

2. The communication apparatus according to claim 1, wherein intervals between the reserved subframes are determined based on the length of the bitmap and the number of subframes in the second set of subframes.

3. The communication apparatus according to claim 1, wherein the reserved subframes are set per n subframes, within the 10240 subframes minus the second set of subframes, n being determined by a following formula:

$$n = FLOOR(X/Y)$$
where $FLOOR$ is the operation of round down to the nearest integer.

4. The communication apparatus according to claim 3, wherein the n subframes do not include the second set.

5. The communication apparatus according to claim 1, wherein a number "n" of subframes, for which at most two of the reserved subframes are set, is at least 100.

6. The communication apparatus according to claim 1, wherein the second set of subframes includes at least one subframe chosen from downlink subframes and special subframes in TDD.

7. The communication apparatus according to claim 1, wherein each bit of the bitmap indicates whether each corresponding subframe is a subframe used for the sidelink operation.

8. The communication apparatus according to claim 1, wherein the bitmap is repeated within the first set of subframes.

9. A communication apparatus, comprising:
  circuitry which, in operation, determines a first set of subframes available for a sidelink operation; and
  a receiver which, in operation, receives a sidelink signal in a subframe among the first set of subframes,
  wherein the first set of subframes is formed of 10240 subframes minus a second set of subframes and minus reserved subframes, the second set of subframes including subframes for transmitting a sidelink synchronization signal (SLSS), and the reserved subframes being determined based on a length of a bitmap configured for the first set of subframes, and
  wherein a number of the reserved subframes (Y) within the 10240 subframes is determined by:

$$Y = X \bmod (\text{the length of the bitmap}),$$
where $X = 10240 - (\text{a number of subframes in the second set of subframes})$, wherein the reserved subframes are set per n subframes, within the 10240 subframes minus the second set of subframes, the n subframes not including the second set, and n being determined by a following formula:

$$n = FLOOR(X/Y),$$

where FLOOR is the operation of round down to the nearest integer,
  wherein the second set of subframes includes at least one subframe chosen from downlink subframes and special subframes in TDD.

10. A communication method comprising:
  determining a first set of subframes available for a sidelink operation; and
  receiving a sidelink signal in a subframe among the first set of subframes,
  wherein, the first set of subframes is formed of 10240 subframes minus a second set of subframes and minus reserved subframes, the second set of subframes including subframes for transmitting a sidelink synchronization signal (SLSS), and the reserved subframes being determined based on a length of a bitmap configured for the first set of subframes, and
  wherein a number of the reserved subframes (Y) within the 10240 subframes is determined by:

$$Y = X \bmod (\text{the length of the bitmap}),$$
where $X = 10240 - (\text{a number of subframes in the second set of subframes})$.

11. The communication method according to claim 10, wherein intervals between the reserved subframes are determined based on the length of the bitmap and the number of subframes in the second set of subframes.

12. The communication method according to claim 10, wherein the reserved subframes are set per n subframes, within the 10240 subframes minus the second set of subframes, n being determined by a following formula:

$$n = FLOOR(X/Y)$$

where FLOOR is the operation of round down to the nearest integer.

13. The communication method according to claim 12, wherein the n subframes does not include the second set.

14. The communication method according to claim 10, wherein the second set of subframes includes at least one subframe chosen from downlink subframes and special subframes in TDD.

15. The communication method according to claim 10, wherein each bit of the bitmap indicates whether each corresponding subframe is a subframe used for the sidelink operation.

\* \* \* \* \*